United States Patent
Palmer et al.

(10) Patent No.: US 10,695,772 B2
(45) Date of Patent: Jun. 30, 2020

(54) FOODSTUFF-GRINDING ATTACHMENT FOR A KITCHEN MACHINE

(71) Applicants: Paul Palmer, Havant (GB); Robert Fields, Havant (GB)

(72) Inventors: Paul Palmer, Havant (GB); Robert Fields, Havant (GB)

(73) Assignee: KENWOOD LIMITED, Havant, Hampshire (GB)

(*) Notice: Subject to any disclaimer, the term of this patent is extended or adjusted under 35 U.S.C. 154(b) by 948 days.

(21) Appl. No.: 14/901,194

(22) PCT Filed: Oct. 22, 2014

(86) PCT No.: PCT/GB2014/053149
§ 371 (c)(1),
(2) Date: Dec. 28, 2015

(87) PCT Pub. No.: WO2015/059470
PCT Pub. Date: Apr. 30, 2015

(65) Prior Publication Data
US 2016/0143484 A1    May 26, 2016

(30) Foreign Application Priority Data
Oct. 23, 2013    (GB) ..................... 1318724

(51) Int. Cl.
*B02C 18/30* (2006.01)
*B02C 18/36* (2006.01)
(Continued)

(52) U.S. Cl.
CPC ............. *B02C 18/30* (2013.01); *A47J 43/044* (2013.01); *A47J 43/0705* (2013.01);
(Continued)

(58) Field of Classification Search
CPC ..... B02C 18/30; B02C 18/301; B02C 18/302; B02C 18/36
(Continued)

(56) References Cited

U.S. PATENT DOCUMENTS 522,424 A * 7/1894 Koenen ................. B02C 18/302
241/82.6
2,436,107 A    2/1948 Haniquet
(Continued)

FOREIGN PATENT DOCUMENTS

CN    202105700 U * 1/2012 ........... B02C 18/302
GB    383804 A    11/1932
(Continued)

OTHER PUBLICATIONS

KitchenAid, Stand Mixer Food Grinder Attachment, "https://web.archive.org/web/20130515053936/http://www.williams-sonoma.com/products/kitchenaid-stand-mixer-food-grinder-attachment/?pkey=cstand-mixer-attachments&", published by Williams-Sonoma Inc., 2013.*

(Continued)

*Primary Examiner* — Shelley M Self
*Assistant Examiner* — Jared O Brown
(74) *Attorney, Agent, or Firm* — Harness, Dickey & Pierce, P.L.C.

(57) ABSTRACT

A foodstuff grinding attachment for connection to a rotary drive outlet of a host device. The attachment includes a main body part having a generally tubular hollowed portion for attachment to the host device. A rotatable scroll-type extruding tool is capable of rotating within a cavity formed in the tubular portion of the main body part and couples with the rotary drive outlet when the main body part is attached to the host device. The main body part includes first and second separable components configured to be secured together for (Continued)

operation of the attachment. The components are separable from one another to provide access to the cavity for cleaning.

9 Claims, 4 Drawing Sheets

(51) Int. Cl.
*A47J 43/07* (2006.01)
*A47J 43/044* (2006.01)

(52) U.S. Cl.
CPC .......... *B02C 18/301* (2013.01); *B02C 18/302* (2013.01); *B02C 18/305* (2013.01); *B02C 18/36* (2013.01); *A47J 43/0711* (2013.01)

(58) Field of Classification Search
USPC ........................................................ 241/82.1
See application file for complete search history.

(56) References Cited

U.S. PATENT DOCUMENTS

| | | | | |
|---|---|---|---|---|
| 3,734,148 A | * | 5/1973 | McCulty | B02C 18/302 241/247 |
| 5,628,466 A | * | 5/1997 | Haack | B02C 18/305 241/285.2 |
| 6,003,797 A | * | 12/1999 | Lin | B02C 18/302 241/82.5 |
| 2004/0021019 A1 | * | 2/2004 | Gaartz | B02C 18/302 241/92 |
| 2007/0277682 A1 | * | 12/2007 | Wong | A47J 19/025 99/495 |

FOREIGN PATENT DOCUMENTS

| | | | | |
|---|---|---|---|---|
| GB | 2415657 A | * | 1/2006 | A47J 43/04 |
| JP | 2003047875 A | * | 2/2003 | B02C 18/302 |

OTHER PUBLICATIONS

European Patent Office Extended Search Report for Application No. 17209177.9 dated Mar. 26, 2018 (10 pages).

International Search Report and Written Opinion of the International Searching Authority for PCT/GB2014/053149, dated Jan. 29, 2015; ISA/EP.

Extended European Search Report for Application No. EP 18 20 9925 dated Jan. 21, 2019 (6 pages).

\* cited by examiner

FOODSTUFF-GRINDING ATTACHMENT FOR A KITCHEN MACHINE

CROSS-REFERENCE TO RELATED APPLICATION

This application is a 371 U. S. National Stage of International Application No. PCT/GB2014/053149, filed on Oct. 22, 2014 and claims priority to Great Britain Application No. 1318724.0, filed on Oct. 23, 2013. The entire disclosures of the above applications are incorporated herein by reference.

This invention relates to a foodstuff-grinding attachment for a kitchen machine, which may be either a dedicated, stand-alone grinding machine driver unit or a multi-purpose kitchen machine (such as a stand mixer) configured as a host device for the attachment.

Such attachments are well known, and are typically made to be driven, by means of an electric motor incorporated into the host device, to grind foodstuffs such as meat and associated products. These attachments comprise a strongly made main body part that houses the working grinder components, which typically include a scroll-type elongate screw, configured as an extruder, that rotates within a specially shaped cavity in the main body part, crushes the meat and transports the crushed meat to and through an apertured end plate affixed to the main body part. The meat is introduced into the cavity in the main body part via a feed-tube and is usually pressed into engagement with the screw by means of a pusher tool that is pushed by a user into the feed-tube. Often a hopper device is provided for insertion into the open end of the feed tube, so as to facilitate the adding of meat to the grinder.

Attachments of the kind just described operate satisfactorily in most respects and, in particular, are well adapted to cope with the high forces and pressures generated within the main body during operation of the meat grinding process. Difficulties arise, however, in cleaning the attachment, and in particular the cavity within the main body, and the invention aims to facilitate such cleaning without unduly compromising the ability of the attachment to resist the aforementioned operationally generated forces.

According to the invention there is provided a foodstuff grinding attachment for connection to a rotary drive outlet presented by a host device; the attachment comprising a main body part having a generally tubular hollowed portion for attachment to the host device; a rotatable scroll-type extruding tool capable of rotating within a cavity formed in said tubular portion of the main body part and provided with means to couple with said rotary drive outlet when the main body part is attached to the host device; means permitting foodstuff to be introduced into the cavity of said tubular body portion and into engagement with the extruding tool for grinding and transport towards an outlet port of the attachment; wherein said main body part comprises first and second separable components configured to be secured together for operation of the attachment and wherein said components are adapted to be separable from one another to provide access to said cavity for cleaning.

In some preferred embodiments of the invention, the first and second components are configured to be slidable relative to one another in a direction substantially parallel to the axis about which said extruding tool rotates; said slidable movement of said components being made in one direction for securing them together and in the opposite direction to separate them.

In other preferred embodiments of the invention, the first and second components are hingedly mounted to one another. In such circumstances, the hinge arrangement may be configured to apply pressure to a joint between the components.

Preferably, abutting edges of the first and second components are formed with connection means whereby the two components are latched securely together. In some such embodiments, the connection means comprises means co-operative tongue and groove configurations.

In some preferred embodiments, the first and second components further bear respective portions of an external screw thread for engagement with an internal screw thread of a nut used to secure the components together.

In some preferred embodiments of the invention, joints between the first and second components are provided with sealing means adapted to resist the expulsion of liquids therethrough. Alternatively, or additionally, said joints may be of labyrinthine configuration.

The invention also encompasses a dedicated, stand-alone grinding machine driver unit hosting an attachment according to any embodiment of the present invention.

The invention further encompasses a stand mixer hosting an attachment according to any embodiment of the present invention.

The invention extends to an attachment substantially as described with reference to and/or as shown in the accompanying drawings. The invention also extends to a stand mixer substantially as described with reference to and/or as shown in FIG. 1.

The invention extends to methods and/or apparatus substantially as herein described with reference to the accompanying drawings.

The invention also provides a computer program and a computer program product for carrying out any of the methods described herein and/or for embodying any of the apparatus features described herein, and a computer readable medium having stored thereon a program for carrying out any of the methods described herein and/or for embodying any of the apparatus features described herein.

Any apparatus feature as described herein may also be provided as a method feature, and vice versa. As used herein, means plus function features may be expressed alternatively in terms of their corresponding structure, such as a suitably programmed processor and associated memory.

Any feature in one aspect of the invention may be applied to other aspects of the invention, in any appropriate combination. In particular, method aspects may be applied to apparatus aspects, and vice versa. Furthermore, any, some and/or all features in one aspect can be applied to any, some and/or all features in any other aspect, in any appropriate combination.

It should also be appreciated that particular combinations of the various features described and defined in any aspects of the invention can be implemented and/or supplied and/or used independently.

In order that the invention may be clearly understood and readily carried into effect, one embodiment thereof will now be described, by way of example only, with reference to the accompanying drawings, of which:

Figure 1:
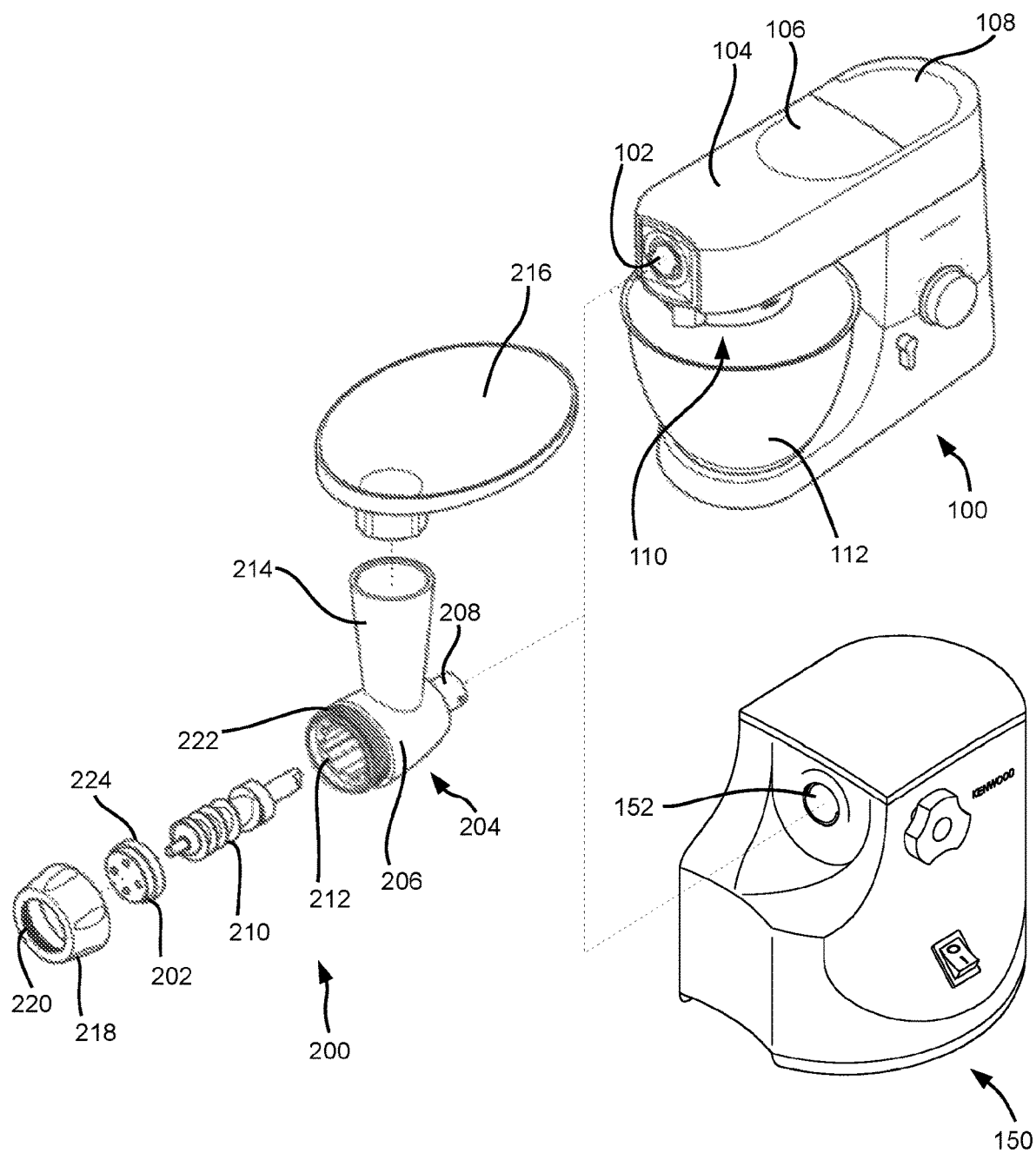
FIG. 1 shows, in exploded and perspective view, a conventional meat-grinding attachment and potential host devices therefor, comprising a stand mixer and a dedicated (stand-alone) meat grinder drive unit respectively.

Referring now to FIG. 1, a multi-purpose kitchen machine comprising a stand mixer of a kind manufactured and sold by the applicants is shown at 100. The invention, of course, can be hosted by many different kinds of multi-purpose kitchen machine and the appliance 100 of FIG. 1 is shown by way of example only.

The machine 100 presents a relatively low-speed, high torque rotary drive outlet 102 at the front of a head portion 104 thereof; the drive outlet 102 being normally concealed, when not in use, behind a removable trim panel (not shown). Other drive outlets having different characteristics (e.g. speed, torque and/or fixture configuration) are provided, in this example, behind trim panels 106 and 108 on the upper surface of the head 104, and on the underside of the head 104, as indicated by the arrow 110; this latter outlet being typically a planetary drive outlet for a beater or mixer tool which is suspended for use into a bowl 112. Other outlets may be provided instead of, or in addition to, those just described.

FIG. 1 additionally shows an arrangement comprising a dedicated meat grinder driving unit 150 housing an electric motor (not shown) and presenting a relatively low-speed, high torque rotary drive outlet 152. Of course, the unit 150 can take any desired form and be provided with any suitable control and switching arrangements without departing from the scope of the invention.

It will be appreciated that each of the drive outlets 102 and 152 provides a rotary drive executed about a horizontal drive axis, and this is convenient for use with attachments 200, such as meat grinders, by means of which meat can be ground and extruded to emerge forwardly from the attachment 200 through an apertured die 202, and fall into a bowl or other receptacle placed beneath the forwardly-facing outlet formed by the die 202. The individual connections of attachments such as 200 to host devices such as 100 and 150 may be the same, allowing attachments to be used at will with either type of host device, or they may differ in which case, of course attachments, such as 200 will be made to fit only one or other of the host devices.

The attachment 200 shown is constructed as a meat-grinding attachment and comprises a main body 204 in the form of a generally tubular, hollow housing 206 provided at one end thereof (the rearwardly-facing end in this example) with a fixture 208 which is configured to be complementary to that presented by the outlet 102 and/or the outlet 152, enabling the housing 204 of the attachment 200 to be releasably secured to the host device 100 and/or 150, and enabling a scroll-like screw extruder device 210 to be rotated by the rotary driver provided at the outlet 102 and/or the outlet 152.

The device 210 is mounted for rotation within a processing cavity 212 in the housing 206, so as to extrude forwardly, and through the die 202, meat and associated products introduced into the processing cavity 212 in the interior of the housing 206 by way of a feed-tube 214 which is usually associated with a removable hopper 216. It will be appreciated that the feed-tube 214 is integrally formed with the housing 206 and thus forms a part of the main body 204 of the attachment 200.

Typically, several dies such as 202 are provided, each formed with a respective array of apertures, and a die 202, selected to suit the required texture or another characteristic of the ground meat, is fitted to the housing 206.

The extruder device 210 and the selected die 202 are retained for operation within the housing 206 by means including a nut 218 which is internally threaded as at 220 and can thus be screwed onto an external threading 222 formed on the forwardly-facing end of the housing 206.

Nut 218 may be knurled or otherwise treated to facilitate its turning to fasten the aforementioned components properly in place within the housing 206. Bearing in mind the stresses and strains that can be imparted to various components during extrusion of relatively viscous materials, however, it is sometimes preferred to form the nut 218 with external driving indentations or protrusions designed to be engaged either by a dedicated spanner or by a general purpose spanner (neither shown), to facilitate loosening of the nut 218 from the housing 206.

As mentioned earlier, a pusher device (not shown) of any convenient design may be provided to enable a user to push meat products through the feed tube 214, thereby to encourage their engagement and interaction with the extruder device 210.

The surface of the cavity 212 which, in use, surrounds the extruder device 210 is, as is known, profiled to encourage the desired interaction between the device 210 and the meat products being ground, and to assist in directing the ground meat products towards the die 202 and hence out of the attachment 200 and into a bowl or other receptacle (not shown) positioned to collect it.

A cutting blade 224 may, in some configurations, be provided in close association with die 202, and configured to rotate with the extruder device 210 whilst the die 202 remains stationary.

It will be appreciated that, whilst the internal components of the attachment 200, such as the extruder scroll 210, the die 202, and the blade 224 (if used), can readily be removed for cleaning once the nut 218 has been removed, the cavity 212 in the main body 204 is difficult to clean, and this is not ideal, bearing in mind that a primary intended usage of the attachment 200 is to grind raw meats.

Figure 2:
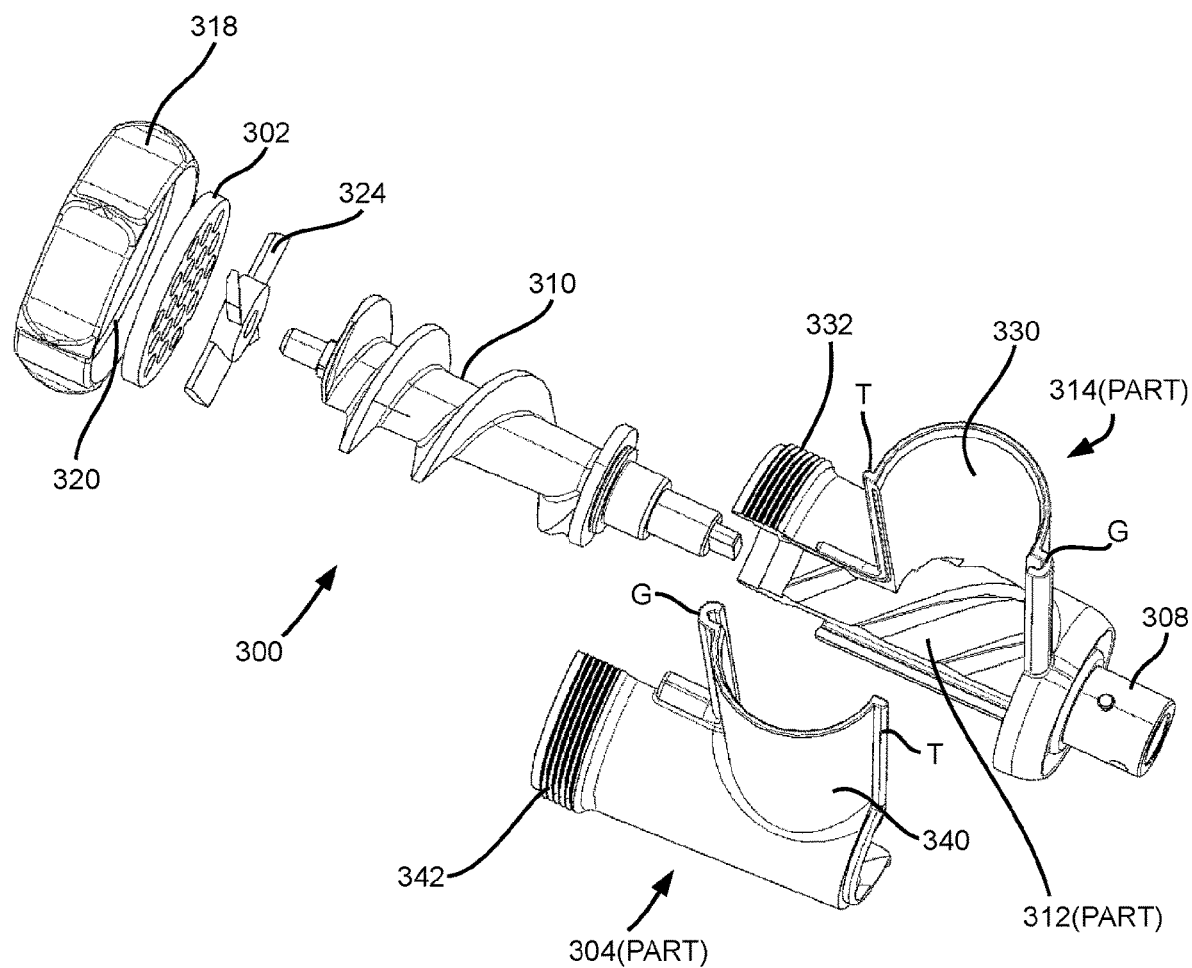
FIG. 2 shows, in similar view to FIG. 1, an attachment in accordance with one example of this invention.

FIG. 2 shows, in similar view to FIG. 1, an attachment 300 in accordance with one example of this invention. In FIG. 2, components similar to those shown in FIG. 1 are given reference numbers increased by 100 over those assigned to their counterpart components in FIG. 1.

Importantly, it will be seen that, in FIG. 2, the main body 304 is split so that the cavity 312 is made readily accessible for cleaning by a simple disassembly procedure.

As shown, the main body 304 (comprising the housing 306 and the feed tube 314) is split into two parts 330 and 340, with one of the parts 330 retaining the rearwardly-facing end form including the fixture 308, by means of which the attachment 300 is attached to the stand mixer 100 and picks up the rotary drive from the outlet 102 and/or the outlet 152. Both parts 330 and 340 bear matching threaded regions 332 and 342 respectively, to receive the internal threading 320 of the fixing nut 318 to secure the forwardly-facing ends of the parts 330 and 340 together. The attachment 300 further includes a die 302 and a cutting blade 324.

Figure 3:
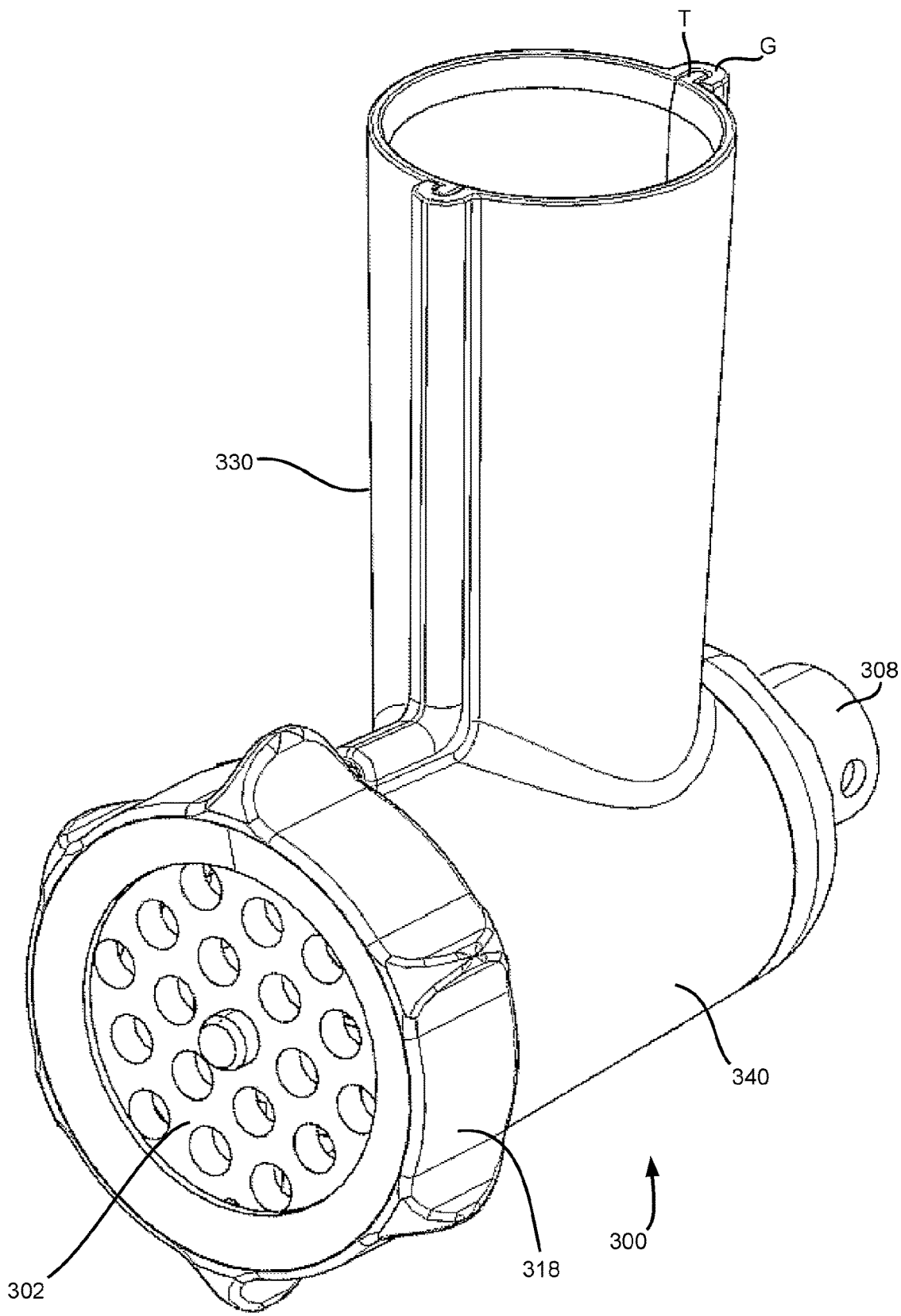
FIG. 3 shows the attachment of FIG. 2 assembled for use.

The pressures involved in the grinding process militate against the use of a simple separable butt-connection between the two main body parts 330 and 340. Accordingly, in this embodiment of the invention, the adjoining edges of the two body parts 330 and 340 are formed with mating tongues T and grooves G; the arrangement being such that the part 340 is aligned with and then slid, relative to the part 330, in a direction parallel to the axis of rotation of the extruder device 310, to engage the tongues T into the grooves G. FIG. 3 shows the attachment 300 assembled and ready for use when connected to the outlet 102 of the stand mixer 100 and/or to the outlet 152 of the unit 150.

It is most desirable that the procedure for securing the two body parts 330 and 340 together should not involve the use of tools, as these are inconvenient for the user and could easily become separated from the remainder of the attachment 300 and mislaid.

It will be appreciated, however, that, even bearing in mind the need to avoid the use of tools for securing the parts together, the process of temporarily securing the two body parts 330 and 340 together could alternatively be achieved by any of a number of different mechanical means, such as over-centre clamps 420 or similar locking systems.

Figure 4:
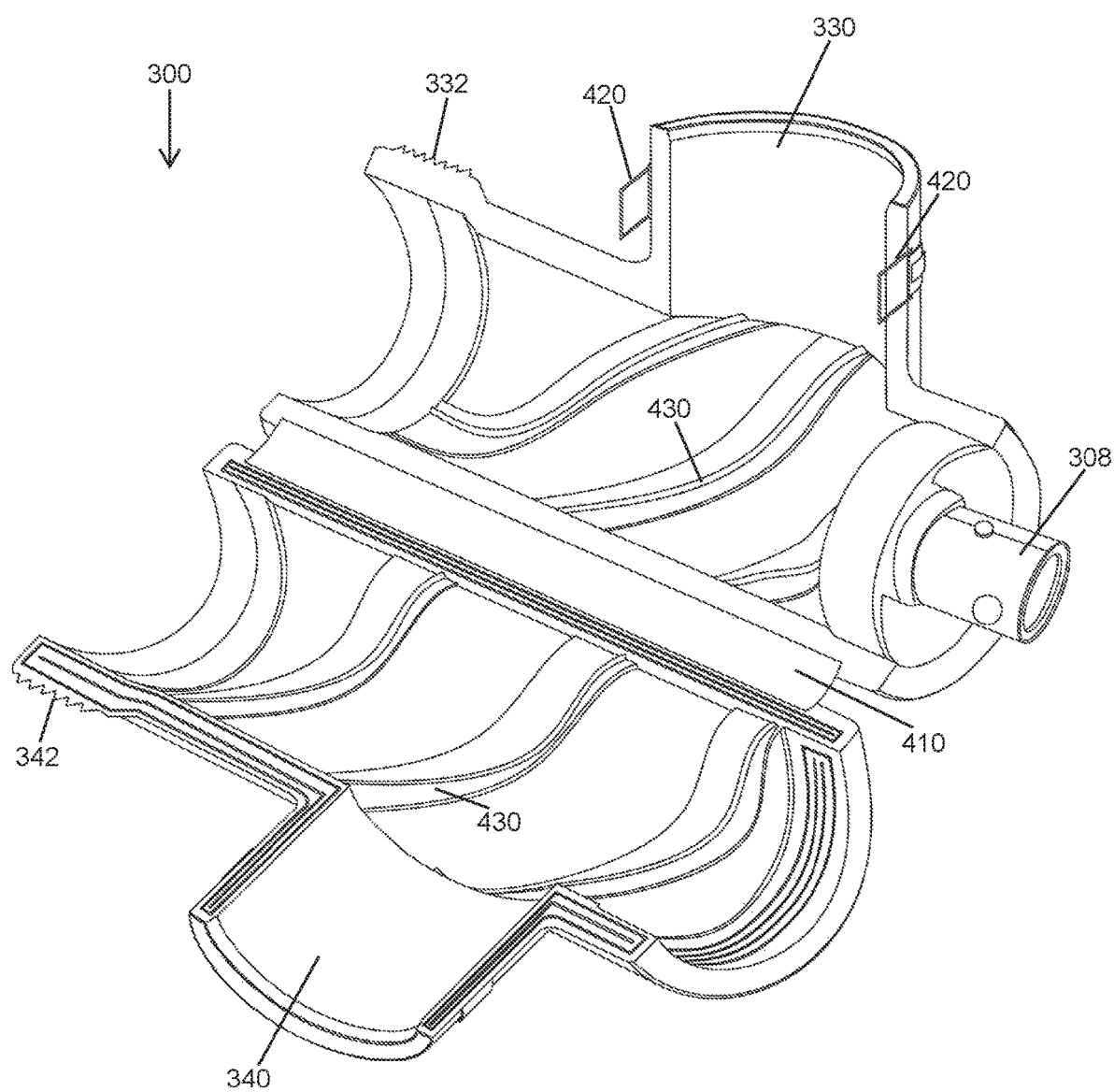
FIG. 4 shows the attachment of FIG. 1 open and including a hinge.

Additionally or alternatively, the two body parts 330 and 340 can be joined together by a hinge 410 (see FIG. 4) or similar arrangement along one of their outside edges; such an arrangement having the benefit that, from the user's standpoint, an attachment such as 300 so modified then comprises no more separate components than the attachment 200. Furthermore, and beneficially, the use of a hinged arrangement means that the two body parts 330 and 340 always remain together when stored.

As the food products that are processed through the meat grinder 300 often have a high fluid content, there is the potential need to keep the fluids contained, and thus the two body parts 330 and 340 are preferably provided with a suitable sealing arrangement. In one example, the required sealing is achieved by the provision of flexible seals, for example of rubber, along the main joints between the two body parts 330 and 340. These seals can be provided on the mating faces of the two body parts 330 and 340, or incorporated into the tongue T and groove G system shown and used for securing of the two body parts 330 and 340 together.

Depending on the particular design of the tongue and groove system used, the seal may be alternatively be achieved by the design of a labyrinthine sealing joint 430 (see FIG. 4), thus obviating the need for a flexible sealing component. If flexible (e.g. rubber) seals are required, they can be formed by overmoulding onto the tongues T, for example, thus making them permanent attachments to the body parts 330 and 340, or they may be provided as separately made attachments that can be slidably attached to and removed from the tongues T.

The main body parts such as 204 of current meat grinding attachments such as 200 are typically made in die cast aluminium or stainless steel, and the main body 304 of the attachment 300 can be made likewise. Alternatively, however, the main body 304 of the attachment 300 can be made from a moulded plastics material, in which case the fluid sealing means can usefully be incorporated into the design of each of the two body parts 330 and 340.

In the event that a hinge device is used to join the two body parts 330 and 340, it can be advantageous to employ a moulded "living" hinge type design 410 (see FIG. 4), which is configured to apply pressure to the joint between the two body parts 330 and 340 during closure and whilst closed.

The split between the two body parts 330 and 340 could be, as shown in FIG. 2, about an axis through both the cylindrical components 306 and 314 or could be just about an axis through the main processing chamber 306 and at an angle to the horizontal. The split could be along straight lines, as shown, or it could be stepped or curved as necessary.

It will be understood that the present invention has been described above purely by way of example, and modifications of detail can be made within the scope of the invention.

Each feature disclosed in the description, and (where appropriate) the claims and drawings may be provided independently or in any appropriate combination.

Reference numerals appearing in the claims are by way of illustration only and shall have no limiting effect on the scope of the claims.

The invention claimed is:

1. A foodstuff grinding attachment for connection to a rotary drive outlet presented by a host device, the rotary drive outlet being rotatable relative to the host device, the attachment comprising:
   a main body part having tubular hollowed portion for fixed attachment to the host device;
   a rotatable scroll-type extruding tool capable of rotating within a cavity formed in said tubular hollowed portion of the main body part and configured to couple with said rotary drive outlet when the main body part is attached to the host device so as to cause relative rotation between the extruding tool and the main body part;
   a foodstuff loader configured for introducing foodstuff into the cavity of said tubular hollowed portion and into engagement with the extruding tool for grinding and transport towards an outlet port of the attachment;
   wherein said main body part comprises first and second separable components configured to be secured together for operation of the attachment and wherein said first and second separable components are adapted to be separable from one another to provide access to said cavity for cleaning;
   wherein the first and second separable components are configured to be slidable relative to one another in a direction parallel to the axis about which said extruding tool rotates;
   said slidable movement of said first and second separable components being made in a first direction for securing said first and second separable components together, the first and second separable components each including a connector whereby the first and second separable components are latched securely together upon sliding movement in the first direction, and said slidable movement of the first and second separable components being made in a second direction that is opposite to the first direction to separate said first and second separable components.

2. An attachment according to claim 1, wherein abutting edges of the first and second separable components are formed with the connectors whereby the first and second separable components are latched securely together.

3. An attachment according to claim 2, wherein the connectors comprises co-operative tongue and groove configurations.

4. An attachment according to claim 1, wherein the connectors include one or more over-center clamps, said first and second separable components are securely latched together, for foodstuff-grinding operation, by the one or more over-center clamps.

5. An attachment according claim 1, wherein the first and second separable components further bear respective portions of an external screw thread for engagement with an internal screw thread of a nut used to secure the first and second separable components together.

6. An attachment according to claim 1, wherein joints between the first and second separable components are provided with a seal adapted to resist the expulsion of liquids therethrough.

7. An attachment according to claim 1, wherein joints between the first and second separable components are provided with a seal of labyrinthine configuration.

8. A, stand-alone grinding machine driver unit comprising an attachment according to claim 1.

9. A stand mixer comprising an attachment according to claim 1.

* * * * *